(12) United States Patent
Ushiyama et al.

(10) Patent No.: US 9,212,295 B2
(45) Date of Patent: Dec. 15, 2015

(54) PRODUCTION METHOD FOR OBTAINING FIBER-REINFORCED COMPOSITE MATERIAL, AND EPOXY RESIN COMPOSITION USED THEREIN

(75) Inventors: Hisaya Ushiyama, Aichi (JP); Yasuhiro Fukuhara, Aichi (JP); Kazuki Koga, Aichi (JP); Tomoo Sano, Aichi (JP); Kazutami Mitani, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 13/985,743

(22) PCT Filed: Feb. 16, 2012

(86) PCT No.: PCT/JP2012/053691
§ 371 (c)(1),
(2), (4) Date: Aug. 15, 2013

(87) PCT Pub. No.: WO2012/111764
PCT Pub. Date: Aug. 23, 2012

(65) Prior Publication Data
US 2013/0330478 A1   Dec. 12, 2013

(30) Foreign Application Priority Data

Feb. 16, 2011   (JP) .................................. 2011-030646

(51) Int. Cl.
*C09D 163/00*   (2006.01)
*B29C 70/44*   (2006.01)
(Continued)

(52) U.S. Cl.
CPC ............ *C09D 163/00* (2013.01); *B29C 70/443* (2013.01); *B29C 70/48* (2013.01); *C08G 59/50* (2013.01); *C08J 5/24* (2013.01); *C08J 2363/00* (2013.01)

(58) Field of Classification Search
None
See application file for complete search history.

(56) References Cited

U.S. PATENT DOCUMENTS

2003/0135011 A1*   7/2003   Goto et al. ...................... 528/93
2004/0170554 A1*   9/2004   Wadahara et al. .......... 423/447.2
(Continued)

FOREIGN PATENT DOCUMENTS

JP     2002-363253 A     12/2002
JP     2005-105267 A      4/2005
(Continued)

OTHER PUBLICATIONS

International Preliminary Report on Patentability (dated Aug. 29, 2013), Written Opinion, and International Search Report (dated May 5, 2012) issued in corresponding International Patent Application No. PCT/JP2012/053691.

*Primary Examiner* — Erma Cameron
(74) *Attorney, Agent, or Firm* — Morgan, Lewis & Bockius LLP

(57) ABSTRACT

Provided is a method for producing a good epoxy resin composition for obtaining fiber-reinforced plastics. A production method for obtaining a fiber-reinforced composite material by impregnating a fiber assembly with an epoxy resin composition and then curing the epoxy resin composition, wherein the epoxy resin composition contains a component [A], a component [B] and a component [C] respectively satisfying the conditions described below. When the blending amount of the component [B] is set to b parts by mass and the blending amount of the component [C] is set to c parts by mass relative to 100 parts by mass of the component [A] contained in the epoxy resin composition, formula (2) is satisfied within the range of formula (1), formula (4) is satisfied within the range of formula (3), and formula (6) is satisfied within the range of formula (5).

14 Claims, 1 Drawing Sheet

(51) Int. Cl.
*B29C 70/48* (2006.01)
*C08J 5/24* (2006.01)
*C08G 59/50* (2006.01)

(56) References Cited

U.S. PATENT DOCUMENTS

| | | | |
|---|---|---|---|
| 2004/0247882 A1* | 12/2004 | Kouchi et al. | 428/413 |
| 2005/0070666 A1 | 3/2005 | Martin | |
| 2006/0035088 A1* | 2/2006 | Takano et al. | 428/413 |
| 2009/0111924 A1* | 4/2009 | Ito et al. | 524/384 |
| 2010/0087582 A1* | 4/2010 | Wang et al. | 524/500 |
| 2010/0087587 A1* | 4/2010 | Wang et al. | 524/538 |
| 2010/0240811 A1* | 9/2010 | He et al. | 524/94 |
| 2011/0009528 A1* | 1/2011 | Tomioka et al. | 523/428 |
| 2011/0152469 A1* | 6/2011 | Cross et al. | 525/523 |
| 2011/0259514 A1* | 10/2011 | Boyle et al. | 156/276 |

FOREIGN PATENT DOCUMENTS

| | | |
|---|---|---|
| JP | 2008-169291 A | 7/2008 |
| JP | 2010-174073 A | 8/2010 |
| JP | 2011-046797 A | 3/2011 |
| JP | 2011-105779 A | 6/2011 |
| WO | 03/040206 A1 | 5/2003 |
| WO | 2007/063580 A1 | 6/2007 |

* cited by examiner

PRODUCTION METHOD FOR OBTAINING FIBER-REINFORCED COMPOSITE MATERIAL, AND EPOXY RESIN COMPOSITION USED THEREIN

TECHNICAL FIELD

The present invention relates to a production method for obtaining a fiber-reinforced composite material and an epoxy resin composition used in the method. The present invention relates particularly to a production method that obtains a fiber-reinforced composite material for obtaining a fiber-reinforced plastic (FRP) suitable for an aircraft structural material application, general industry application, automotive application, shipbuilding application, sports application, and the like, and an epoxy resin composition used in the method.

BACKGROUND ART

FRP is lightweight while having superior mechanical characteristics such as strength, stiffness and fatigue resistance, and is therefore widely used in sports application, aerospace application, general industry application and the like. Especially for purposes requiring high performance, FRP with a continuous fiber is used. Carbon fiber is widely used as a reinforcing fiber and a thermosetting resin, specifically an epoxy resin, is widely used as a matrix resin.

As a method for producing FRP, autoclave molding, vacuum bag molding, filament winding molding, pultrusion molding, resin transfer molding (RTM) and the like are known, and an appropriate method is selected therefrom according to the shape, size, production volume and the like of an intended product. Especially for applications requiring high performance, autoclave molding and vacuum bag molding, in which a prepreg, which is a sheet-like intermediate base material in which a reinforcing fiber is impregnated with uncured matrix resin, is laminated and cured are widely used. RTM, in which a mold is first loaded with a preform as a fiber reinforcing material, a liquid resin is then injected thereinto and cured to thereby obtain FRP, has advantages in enabling easy and low-cost molding of a complex shaped product. Since a method of production high performance FRP has been developed by engineering development in recent years, RTM is recently attracting attention and begins to be applied to a molding method for an aircraft structural material.

As the matrix resin for FRP, thermosetting resin such as epoxy resin, phenol resin, bismaleimide resin and vinylester resin, as well as thermoplastic resin such as polypropylene, methyl methacrylate and polycarbonate can be exemplified. Among these, the thermosetting resin is used as the resin for prepreg and RTM. In the aviation field in which high performance is required, epoxy resin which is superior in heat resistance property and toughness is widely used.

As a curing agent used along with the epoxy resin for the prepreg or RTM, aliphatic polyamine, aromatic polyamine, acid anhydride, Lewis acid complex and the like are known. Especially for FRP used in the aviation field, which requires a heat resistant property in many cases, aromatic polyamine is generally used as the curing agent. More specifically, diaminodiphenyl sulfone is superior in physical properties such as heat resistance property, elasticity, toughness, and moisture absorbing property after curing, and superior in preservation stability after blending with the epoxy resin before curing. Therefore, diaminodiphenyl sulfone can be preserved in a state of being blended with epoxy resin, and can thus be treated as a so-called one-component epoxy resin. Diaminodiphenyl sulfone is widely used especially in fields requiring heat resistance due to these properties.

However, in the above described molding method using prepreg and the molding method of RTM, upon impregnating reinforcing fiber having a small filament diameter with a resin, upon production a heavy weight prepreg, and upon impregnating a heavy weight preform with a resin, using a solid component such as diaminodiphenyl sulfone as a curing agent, only the solid component (curing agent) is filtered by a reinforcing fiber surface and the local blending ratio of the curing agent is changed, leading to curing failure of the cured product (molded product) which may cause deteriorated physical properties and deteriorated appearance. Generally, CFRP after molding is wiped with a solvent to clean the surface thereof. In a case with such curing failure, there will be a problem of a resin component leaking out from the CFRP during wiping with the solvent to make the surface sticky and less smooth. In a case with severer curing failure, there will be a problem of CFRP after molding being easily plastically deformed due to insufficient stiffness, leading to instability in shape.

In an epoxy resin composition containing only 3,3'-diaminodiphenyl sulfone or only 4,4'-diaminodiphenyl sulfone as the curing agent, the curing agent does not dissolve in epoxy resin at a temperature lower than about 120° C. Given this, in a case of impregnating the reinforcing fiber with the epoxy resin composition at a lower temperature, for example, at about 80° C., the curing agent may be filtered with a certain filament diameter of the reinforcing fiber and a certain basis weight of a reinforcing fiber assembly, leading to deterioration in physical properties of the FRP. In order to avoid the filtration of the curing agent, the epoxy resin composition must be heated up to at least 120° C. However, since the curing reaction proceeds at such a temperature, control of production process is extremely difficult.

Patent Document 1 discloses an epoxy resin composition having high heat resistant property and toughness, and can retain low viscosity for an extended period of time, while reducing filtration of a curing agent during molding by RTM. When using the epoxy resin composition disclosed in Patent Document 1, filtration of a curing agent during molding of FRP can be reduced. However, in the technique disclosed in Patent Document 1, in order to dissolve the curing agent, the epoxy resin composition must be heated up to 120° C. at which the curing reaction proceeds.

On the other hand, in molding by RTM, a liquid curing agent is often used in order to avoid filtration of the curing agent and facilitate impregnation. More specifically, a liquid acid anhydrate curing agent and a liquid amine type curing agent are generally used. However, these liquid curing agents are low in preservation stability after blending with the epoxy resin, and react gradually when blended with the epoxy resin, whereby an increase in viscosity occurs. Due to this, an application as a one-component epoxy resin is not possible and only an application as a two-component epoxy resin is possible, in which a base resin and a curing agent must be separately prepared, and blended and measured immediately before an impregnation process. Meanwhile, the acid anhydrate curing agent has a problem of alteration by absorption of moisture which causes reduced curing property and reduced heat resistant property of a cured product, and a problem of moisture absorbing property after curing. The liquid amine type curing agent is inferior to the above described diaminodiphenyl sulfone in heat resistant property, stiffness, linear expansion coefficient, and moisture absorbing property of the cured product.

Patent Document 2 discloses an epoxy resin composition, a prepreg, and a fiber-reinforced composite material which can give a cured product having superior heat resistant property as well as superior elasticity and low moisture absorption under a condition of high room temperature, high temperature and high humidity. The epoxy resin composition disclosed in Patent Document 2 can give a fiber-reinforced composite material using a prepreg that is superior in various physical properties after curing; however, since the viscosity of the resin composition is high and diaminodiphenyl sulfone in powder form is used as the curing agent, there will be a problem of impregnation failure being caused due to filtration of the curing agent, upon RTM molding and production of a heavy weight prepreg.

Patent Document 3 discloses an epoxy resin composition, a prepreg, and a carbon fiber composite material with diaminodiphenyl sulfone as a curing agent, that can provide superior molding properties without using an autoclave. In addition, in the Examples of Patent Document 3, an example using diaminodiphenyl sulfone in a dissolved state is disclosed, which seemingly can prevent impregnation failure due to filtration of the curing agent during impregnation with resin. However, the resin composition is high in viscosity and must be retained in a high temperature environment in order to dissolve diaminodiphenyl sulfone. The resin thus becomes more viscous when diaminodiphenyl sulfone dissolves, leading to a problem of impregnation failure upon RTM molding and production of a heavy weight prepreg. Furthermore, since a curing reaction by diaminodiphenyl sulfone begins during the process of dissolving diaminodiphenyl sulfone, there will be a problem of difficulty in control of the viscosity of the resin composition and extreme difficulty in stabilize quality of a prepreg being produced.

Patent Document 1: Japanese Unexamined Patent Application, Publication No. 2008-169291
Patent Document 2: Japanese Unexamined Patent Application, Publication No. 2002-363253
Patent Document 3: Japanese Unexamined Patent Application, Publication No. 2005-105267

DISCLOSURE OF THE INVENTION

Problems to be Solved by the Invention

As described above, if only diaminodiphenyl sulfone of a singular structure is used, the curing agent cannot be dissolved at a temperature under 120° C. Therefore, if the reinforcing fiber is impregnated with the epoxy resin composition under a milder condition, the curing agent is filtered as described above, leading to reduction in the physical properties of FRP. In addition, at a high temperature of 120° C. or higher, since a curing reaction proceeds during the dissolving process of the curing agent, control of production process is extremely difficult.

Means for Solving the Problems

The inventor has conducted an extensive research in order to solve the above described problems, and has discovered that a production method that gives a fiber-reinforced composite material of the following configuration and an epoxy resin composition used therein can solve the problems. The modes of the present invention are as follows.

Aspect (1)

A production method for obtaining a fiber-reinforced composite material by impregnating a fiber assembly with an epoxy resin composition and curing, comprising preparing the epoxy resin composition including a constitutional element [A], a constitutional element [B], and a constitutional element [C] by blending at at least 60° C. and no higher than 80° C., wherein, given that a blending amount of the constitutional element [B] is b parts by mass and a blending amount of the constitutional element [C] is c parts by mass with respect to 100 parts by mass of the constitutional element [A], the epoxy resin composition satisfies an equation (2) in a range of an equation (1), an equation (4) in a range of an equation (3), and an equation (6) in a range of an equation (5) and the constitutional element [A], the constitutional element [B], and the constitutional element [C] satisfy the following conditions: the constitutional element [A]: an epoxy resin of a converted molecular weight a;

the constitutional element [B]: 3,3'-diaminodiphenyl sulfone; and the constitutional element [C]: 4,4'-diaminodiphenyl sulfone, $$150 < a \leq 200 \tag{1}$$

$$0 < b/(b+c) < 1 \tag{2}$$

$$200 < a \leq 350 \tag{3}$$

$$0.002a - 0.35 \leq b/(b+c) \leq -0.002a + 1.35 \tag{4}$$

$$350 < a \tag{5}$$

$$0.35 \leq b/(b+c) \leq 0.65 \tag{6}$$

the converted molecular weight a being defined as follows: in a case of using only one kind of epoxy resin as the epoxy resin [A], the converted molecular weight a is a product of an epoxy equivalent of the epoxy resin used and the number of epoxy groups in a molecule of the epoxy resin; and in a case of using a plurality of kinds of epoxy resin as the epoxy resin [A], the converted molecular weight a is a value obtained by: obtaining a product of an epoxy equivalent and the number of epoxy groups in a molecule of the epoxy resin for each epoxy resin component; and then weighted-averaging, per blending ratios of components composing the epoxy resin [A], the product of the epoxy equivalent and the number of epoxy groups thus obtained for each epoxy resin component.

Aspect (2)

The method for obtaining a fiber-reinforced composite material described in the aspect (1), wherein the epoxy resin composition further satisfies an equation (7)

$$15 \leq (b+c) \leq 70 \tag{7}$$

Aspect (3)

An epoxy resin composition comprising a constitutional element [A], a constitutional element [B], and a constitutional element [C] described later, wherein, given that a blending amount of the constitutional element [B] is b parts by mass and a blending amount of the constitutional element [C] is c parts by mass with respect to 100 parts by mass of the constitutional element [A], the epoxy resin composition satisfies equation (9) in a range of equation (8), equation (11) in a range of equation (10), and equation (13) in a range of equation (12), wherein the constitutional element [A]: an epoxy resin of a converted molecular weight a;
the constitutional element [B]: 3,3'-diaminodiphenyl sulfone; and
the constitutional element [C]: 4,4'-diaminodiphenyl sulfone, $$150 < a \leq 200 \quad (8)$$

$$0 < b/(b+c) < 1 \quad (9)$$

$$200 < a \leq 350 \quad (10)$$

$$0.002a - 0.35 \leq b/(b+c) \leq -0.002a + 1.35 \quad (11)$$

$$350 < a \quad (12)$$

$$0.35 \leq b/(b+c) \leq 0.65 \quad (13).$$

the converted molecular weight a being defined as follows:
in a case of using only one kind of epoxy resin as the epoxy resin [A], the converted molecular weight a is a product of an epoxy equivalent of the epoxy resin used and the number of epoxy groups in a molecule of the epoxy resin;
and in a case of using a plurality of kinds of epoxy resin as the epoxy resin [A], the converted molecular weight a is a value obtained by: obtaining a product of an epoxy equivalent and the number of epoxy groups in a molecule of the epoxy resin for each epoxy resin component; and then weighted-averaging, per blending ratios of components composing the epoxy resin [A], the product of the epoxy equivalent and the number of epoxy groups thus obtained for each epoxy resin component.

Aspect (4)

The epoxy resin composition described in the aspect (3), wherein the epoxy resin composition satisfies an equation (15) in a range of an equation (14), an equation (17) in a range of an equation (16), and an equation (19) in a range of an equation (18):

$$150 < a \leq 190 \quad (14)$$

$$0.1 \leq b/(b+c) \leq 0.9 \quad (15)$$

$$190 < a \leq 365 \quad (16)$$

$$0.002a - 0.28 \leq b/(b+c) \leq -0.0017a + 1.23 \quad (17)$$

$$365 < a \quad (18)$$

$$0.45 \leq b/(b+c) \leq 0.60 \quad (19).$$

Aspect (5)

The epoxy resin composition described in the aspect (3) or (4), wherein the epoxy resin composition further satisfies an equation (20):

$$150 < a < 800 \quad (20)$$

Aspect (6)

The epoxy resin composition described in any one of the aspects (3) to (5), wherein the epoxy resin composition further satisfies equations (21) and (22):

$$150 \leq a \leq 357 \quad (21)$$

$$0.00169a - 0.103 \leq b/(b+c) \leq -0.0019a + 1.19 \quad (22)$$

Aspect (7)

The epoxy resin composition described in any one of the aspects (3) to (6), wherein the epoxy resin composition further satisfies equations (23) and (24):

$$150 \leq a \leq 300 \quad (23)$$

$$0.00169a - 0.103 \leq b/(b+c) \leq -0.0010a + 0.90 \quad (24).$$

Aspect (8)

The epoxy resin composition described in any one of the aspects (3) to (7), wherein the epoxy resin composition further satisfies an equation (25):

$$15 \leq (b+c) \leq 70 \quad (25).$$

Effects of the Invention

According to the production method that gives a fiber-reinforced composite material and the epoxy resin composition used therein of the present invention, diaminodiphenyl sulfone can be dissolved in the epoxy resin at a lower temperature and filtration of the curing agent upon molding of FRP can be reduced, thereby suppressing various problem such as reduction in physical properties due to curing failure.

PREFERRED MODE FOR CARRYING OUT THE INVENTION

Figure 1:
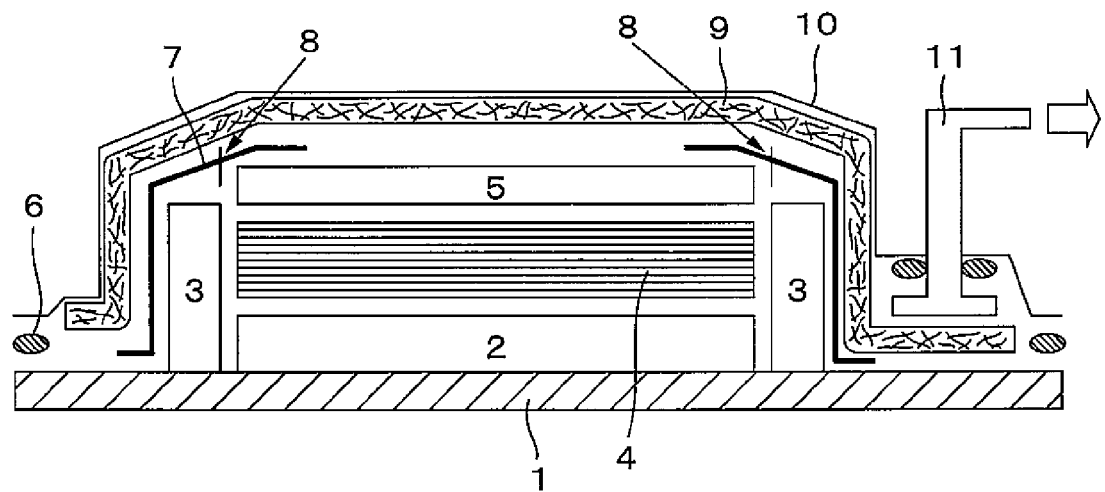
FIG. 1 is a diagram illustrating molding according to an aspect of the present invention.

For the production method of a fiber-reinforced composite material and the epoxy resin composition used therein of the present invention, preferred embodiments of the present invention are described hereinafter; however, the present invention is not limited to only these embodiments.

Epoxy Resin Composition

Epoxy Resin [A]

As the epoxy resin [A], various products that are commercially distributed by epoxy resin manufacturers can be used, such as a bisphenol A type epoxy resin, a bisphenol F type epoxy resin, a bisphenol S type epoxy resin, a naphthalene type epoxy resin, and an alicyclic epoxy resin. For example, CELLOXIDE (trademark) 3000 (manufactured by Daicel Corporation), GAN (manufactured by Nippon Kayaku Co., Ltd.), jER630 (manufactured by Mitsubishi Chemical Corporation), HP4032 (manufactured by DIC Corporation), CELLOXIDE (trademark) 2081 (manufactured by Daicel Corporation), jER828 (manufactured by Mitsubishi Chemical Corporation), jER807 (manufactured by Mitsubishi Chemical Corporation), jER152 (manufactured by Mitsubishi Chemical Corporation), jER604 (manufactured by Mitsubishi Chemical Corporation), MY-0500 (manufactured by Huntsman Advanced Materials), MY-0600 (manufactured by Huntsman Advanced Materials), TETRAD-X (manufactured by Mitsubishi Gas Chemical Company), SR-HHPA (manufactured by Sakamoto Yakuhin Kogyo Co.,Ltd.), EXA-4580-1000 (manufactured by DIC Corporation), EX-201 (manufactured by Nagase ChemteX Corporation), 1500NP (manufactured by Kyoeisha Chemical Co., Ltd.) can be exemplified; however, the present invention is not limited thereto. The epoxy resin may employ one type alone, or may jointly use two types or more.

3,3'-diaminodiphenyl sulfone [B]

In the present invention, 3,3'-diaminodiphenyl sulfone [B] is used as a curing agent. D90 of 3,3'-diaminodiphenyl sulfone [B] is preferably no greater than 30 μm and more preferably no greater than 10 μm. The smaller D90 of 3,3'-diaminodiphenyl sulfone [B] can reduce required time for dissolving 3,3'-diaminodiphenyl sulfone [B] in the epoxy resin [A], and therefore is more preferable. It should be noted that the abovementioned D90 is defined as follows. D90: a particle diameter at 90% of all the particles in the cumulative volume distribution of particles of the curing agent from smallest to largest 4,4'-diaminodiphenyl sulfone [C]

In the present invention, 4,4'-diaminodiphenyl sulfone [C] is used as a curing agent. D90 of 4,4'-diaminodiphenyl sulfone [C] is preferably no greater than 30 μm, and more preferably no greater than 10 μm. The smaller D90 of 4,4'-diaminodiphenyl sulfone [C] can reduce the required time for dissolving 4,4'-diaminodiphenyl sulfone [C] in the epoxy resin [A], and therefore is more preferable. It should be noted that the abovementioned D90 is defined as follows. D90: a particle diameter at 90% of all the particles in the cumulative volume distribution of particles of the curing agent from smallest to largest A preferable blending amount of diaminodiphenyl sulfone is as follows: a total amount of 3,3'-diaminodiphenyl sulfone [B] and 4,4'-diaminodiphenyl sulfone [C] (b +c) is 15 to 70 parts by mass with respect to 100 parts by mass of the epoxy resin [A]. A blending amount smaller than 15 parts by mass may cause problems such as: failure in curing despite heating the epoxy resin composition; insufficient stiffness of the cured product due to curing failure; the resin component leaking out in contact with a solvent due to curing failure, causing a sticky surface; and low heat resistance and fragility of the cured product. On the other hand, the blending amount (b+c) greater than 70 parts by mass increases the ratio of powder component in the composition, making it difficult to blend 3,3'-diaminodiphenyl sulfone [B] and 4,4'-diaminodiphenyl sulfone [C] into the epoxy resin [A]. This also may cause various problems such as: failure in curing despite heating the epoxy resin composition; insufficient stiffness of the cured product due to curing failure; the resin component leaking out in contact with a solvent due to curing failure, causing a sticky surface; and low heat resistance and fragility of the cured product.

As a molar ratio, the amount of active hydrogen derived from amino groups summing 3,3'-diaminodiphenyl sulfone [B] and 4,4'-diaminodiphenyl sulfone [C] is preferably 0.4 mol to 1.5 mol, and more preferably 0.8 mol to 1.2 mol, with respect to 1 mole of epoxy groups of the epoxy resin [A]. An amount of active hydrogen smaller than 0.4 mol or greater than 1.5 mol may significantly deteriorate the heat resistant property and toughness of a cured product obtained by curing the epoxy resin composition.

It is preferable for the epoxy resin [A], 3,3'-diaminodiphenyl sulfone [B] and 4,4'-diaminodiphenyl sulfone [C] to respectively satisfy the requirements described in aspect (3). In a case in which the requirements described in aspect (3) are satisfied, the curing agent can dissolve in the epoxy resin [A] under a milder condition (for example, at 80° C. for 1 hour) than the temperature (about 120° C.) at which diaminodiphenyl sulfone of a single structure dissolves. In addition, it is more preferable for the epoxy resin [A], 3,3'-diaminodiphenyl sulfone [B] and 4,4'-diaminodiphenyl sulfone [C] to respectively satisfy the requirements described in aspect (4). In a case in which the requirements described in aspect (4) are satisfied, the curing agent can dissolve in the epoxy resin [A] under a milder condition (for example, at 70° C. for 2 hours) than the condition described in aspect (3) for dissolving the curing agent in the epoxy resin composition.

In addition, it is yet more preferable for the converted molecular weight a of the epoxy resin [A] to satisfy requirements described in aspect (5). In a case in which the converted molecular weight a is lower than 150, the number of atoms constituting the basic skeleton of the epoxy resin cannot be large. This makes it difficult to impart sufficient stiffness, heat resistant properties, and toughness to a cross linked structure after curing. On the other hand, in a case in which the converted molecular weight a is greater than 800, the resin composition becomes too viscous and difficult to blend diaminodiphenyl sulfone thereinto.

In addition, it is more preferable for the epoxy resin [A], 3,3'-diaminodiphenyl sulfone [B] and 4,4'-diaminodiphenyl sulfone [C] to respectively satisfy the requirements described in aspect (6). In a case in which the requirements described in aspect (6) are satisfied, the curing agent can dissolve in the epoxy resin [A] under a milder condition (for example, at 65° C. for 1 hour) than the conditions described in aspects (3) to (5) for dissolving the curing agent in the epoxy resin composition.

However, it is not preferable to satisfy these requirements in a case of using liquid aromatic diamine in combination with the constitutional element [B] and the constitutional element [C], because the blending amounts of the constitutional element [B] and the constitutional element [C] must be reduced in order to avoid precipitation of the constitutional element [B] and the constitutional element [C] from the liquid aromatic diamine, leading to limitation in an effect of improving physical properties such as heat resistance property, elasticity, toughness, and moisture absorbancy after curing, and restriction in use such as application as one-component epoxy resin.

The epoxy resin composition used in the present invention can contain various additives as necessary. As the additives, a curing accelerator for improving reactivity, a thermoplastic resin for controlling fluidity, rubber particles for adding toughness to the epoxy resin composition, inorganic particles for adding thixotropy to and improving stiffness of the epoxy resin composition, and a surfactant for improving wettability with respect to the reinforcing fiber can be exemplified; however, the present invention is not limited thereto.

As preferred examples of the curing accelerator, an imidazole compound, a urea compound such as phenyl dimethyl urea (PDMU), amine complexes such as monoethylamine trifluoride and boron trichloride amine complexes can be exemplified.

As preferred examples of the thermoplastic resin, polyacrylate, polyamide, polyaramide, polyester, polycarbonate, polyphenylene sulfide, polybenzimidazole, polyimide, polyetherimide, polysulfone and polyethersulfone can be exemplified. The abovementioned thermoplastic resins can either be blended in a state of being dissolved in the epoxy resin composition, or be arranged on a surface layer of a prepreg or a preform in the form of fine particles, long fibers, short fibers, woven fabric, nonwoven fabric, mesh, pulp, or the like. The thermoplastic resin can be used either singly or in combination of two or more.

As the rubber particles, crosslinked rubber particles and core-shell rubber particles in which a dissimilar polymer is graft polymerized on the surface of crosslinked rubber particles are preferably used from the viewpoint of ease of handling. The type of rubber is not particularly limited and, for example, butadiene rubber, an acrylic rubber, a silicone rubber, a butyl rubber, NBR, and SBR are used.

As preferred examples of the crosslinked rubber particles, YR-500 series (manufactured by Tohto Kasei Co., Ltd.) can be exemplified. The crosslinked rubber particles can be blended along with other components upon preparing the epoxy resin composition; however, it is preferable to use a crosslinked rubber particle-dispersed epoxy resin of masterbatch type, in which the crosslinked rubber particles are dispersed in advance in the epoxy resin [A], due to being able to reduce the preparation time of the epoxy resin composition. As the crosslinked rubber particle-dispersed epoxy resin of masterbatch type, BPF307 or BPA328 (manufactured by Nippon Shokubai Co., Ltd.) as well as MX-156 containing butadiene rubber or MX-960 containing silicon rubber (Kaneka Corporation) can be exemplified.

As preferred examples of the core-shell rubber particles: W-5500 or J-5800 using acrylic rubber (manufactured by Mitsubishi Rayon Co.,Ltd.); SRK-200E (manufactured by Mitsubishi Rayon Co.,Ltd.) using silicone/acrylic composite rubber (manufactured by Mitsubishi Rayon Co.,Ltd.); PARALOID (registered trademark) EXL-2655 composed of butadiene/alkyl methacrylate/styrene copolymer (manufactured by Kureha Chemical Industry Co., Ltd.); STAPHYLOID (registered trademark) AC-3355 and TR-2122 composed of acrylic ester/methacrylic ester copolymer (manufactured by Takeda Pharmaceutical Company Limited); and PARALOIDEXL-2611 or EXL-3387 composed of butyl acrylate/methyl methacrylate copolymer (manufactured by Rohm & Haas) can be exemplified.

As preferred examples of the inorganic particles, carbon black, silica, aluminum hydroxide, smectite, magnesium oxide, talc, synthetic mica, calcium carbonate, steel, and the like can be exemplified.

As a preferred example of the surfactant for improving wettability, BYK-A530 (BYK-Chemie Japan K.K.) and the like can be exemplified.

Uses of Epoxy Resin Composition

Since the epoxy resin composition of the present invention can reduce filtration of the curing agent at the surface of the reinforcing fiber and can suppress deterioration in physical properties of FRP due to curing failure, the epoxy resin composition can provide high productivity when used in molding using a prepreg and in RTM. It should be noted that the use of the epoxy resin composition is not limited thereto and also can be used in a wide range of uses such as encapsulating material for electronic materials, paint, adhesive and the like.

Production Method for Obtaining Fiber-Reinforced Composite Material

Since the present invention allows molding of diaminodiphenyl sulfone, which is superior in physical properties after curing, without causing impregnation failure due to filtration or increased viscosity of the curing agent upon impregnation of the reinforcing fiber in the resin composition, any production method can be employed for combining the reinforcing fiber with the resin composition. The present invention is particularly effective in infusion molding such as RTM, VaRTM and resin infusion molding, as well as molding using a heavy weight prepreg, since impregnation failure often occurs due to filtration or increased viscosity of the curing agent. The production method for obtaining the fiber-reinforced composite material obtains the fiber-reinforced composite material by, for example, impregnating the fiber assembly with the epoxy resin composition, and then curing as described in aspect (1). In such a case, it is necessary to blend the epoxy resin composition at at least 60° C. and no higher than 80° C., then to impregnate the fiber assembly with the epoxy resin composition containing the constitutional element [A], the constitutional element [B] and the constitutional element [C] satisfying the conditions described in aspect (1), and then to cure. Blending at at least 60° C. and no higher than 80° C. can be performed after agitating the epoxy resin composition to disperse the constitutional element [B] and the constitutional element [C] within the constitutional element [A]. Blending at at least 60° C. and no higher than 80° C. while agitating the epoxy resin composition is more preferable since the dissolution time of the constitutional element [B] and the constitutional element [C] can be reduced. Blending at at least 60° C. and no higher than 80° C. while dispersing the constitutional element [B] and the constitutional element [C] is also preferable from the viewpoint of a reduction in production time. The agitator is not particularly limited, however, a device that can provide a shearing force to the resin composition, for example, a triple roll, a kneader, a planetary mixer, and a planetary centrifugal mixer, is especially preferable from the viewpoint of reducing the time for dispersion and dissolution of the constitutional element [B] and the constitutional element [C]. By employing this method, the constitutional element [B] and the constitutional element [C] that are dissolved in the constitutional element [A] are not filtered at the surface of the reinforcing fiber in the reinforcing fiber assembly. As a result, the local blending ratio of the curing agent will not vary, and thus no deterioration in physical properties and appearance of the cured product (molded product) will occur.

EXAMPLES

The present invention will be described in more detail by way of examples; however, the present invention is not intended to be limited to these examples.

Preparation of Epoxy Resin Composition

The epoxy resin composition of the present invention was prepared by measuring the components ([A] to [C]) described in aspect (1) or (3) in a container and agitating the components for 5 minutes and degassing for 1 minute and 30 seconds using a hybrid mixer HM-500 (manufactured by KEYENCE CORPORATION).

Evaluation of Degree of Dissolution of Diaminodiphenyl Sulfone

In order to evaluate the degree of dissolution of diaminodiphenyl sulfone, visual evaluation was made. The epoxy resin composition prepared by the above described method was placed in a container,and exposed to an environment under Condition 1 or Condition 2 described below. After exposing to the environment under respective Conditions 1 to 3, the degree of dissolution of diaminodiphenyl sulfone in the epoxy resin composition was assessed, and evaluated by assigning symbols of circle, triangle, and cross. The meanings of the symbols are described below.

Condition 1: Exposure for 1 hour in a high temperature incubator HISPEC HT310S (manufactured by Kusumoto Chemicals, Ltd.) set to 80° C. under room humidity Condition 2: Exposure for 2 hours in the high temperature incubator HISPEC HT310S (manufactured by Kusumoto Chemicals, Ltd.) set to 70° C. under room humidity Condition 3: Exposure for 1 hour in a high temperature incubator HISPEC HT310S (manufactured by Kusumoto Chemicals, Ltd.) set to 65° C. under room humidity A circle symbol indicates that the curing agent is completely dissolved and the epoxy resin composition becomes transparent after the exposure under the above described condition. A triangle symbol indicates that although dissolution of the curing agent was observed, dissolved residue remained, and the epoxy resin composition remains cloudy after the exposure under the above described condition. A cross symbol indicates that a large part of the curing agent is undissolved and an appearance of the epoxy resin composition is not substantially changed between before and after the exposure under the above described condition.

Examples 1 to 35

Epoxy resin compositions were prepared with the raw material compositions shown in Tables 1 and 2 ("parts" indicates parts by mass) and the degrees of dissolution of the curing agent were evaluated by visual evaluation. The evaluation results of the contents of the epoxy resin composition ("parts" indicates parts by mass) are shown in Tables 1 and 2.

Comparative Examples 1 to 21

Epoxy resin compositions were prepared with the raw material compositions shown in Table 3 ("parts" indicates parts by mass) and the degrees of dissolution of the curing agent were evaluated by visual evaluation in a similar manner to Example 1. The results are shown in Table 3.

The raw materials used for preparing the resins are described in detail below. It should be noted that D90 of the curing agent was measured by an AEROTRAC SPR (registered trademark) MODEL7340 (manufactured by Nikkiso Co., Ltd.). The measurement of D90 was performed by dry measurement with a focal length of 100 mm.

CELLOXIDE (registered trademark) 3000: alicyclic epoxy resin, manufactured by Daicel Corporation, converted molecular weight 187 jER630: para-aminophenol type epoxy resin, manufactured by Mitsubishi Chemical Corporation, converted molecular weight 288 jER604: tetraglycidyl diaminodiphenyl methane type epoxy resin, manufactured by Mitsubishi Chemical Corporation, converted molecular weight 480

EX-201: resorcinol diglycidyl ether, manufactured by Nagase ChemteX Corporation, trade name "Denacol EX-201", converted molecular weight 234

1500NP: neopentyl glycol diglycidyl ether, manufactured by Kyoeisha Chemical, trade name "EPOLIGHT 1500NP", converted molecular weight 270

GAN: diglycidylaniline, manufactured by Nippon Kayaku Co., Ltd., converted molecular weight 250 jER828: bisphenol A-type epoxy resin, manufactured by Mitsubishi Chemical Corporation, converted molecular weight 378 jER807: bisphenol F-type epoxy resin, manufactured by Mitsubishi Chemical Corporation, converted molecular weight 336

EXA-4850-1000: bifunctional epoxy resin, manufactured by DIC Corporation, converted molecular weight 700 jER1001: bisphenol A-type epoxy resin, manufactured by Mitsubishi Chemical Corporation, converted molecular weight 950

3,3'-DDS: crushed 3,3'-diaminodiphenyl sulfone, active hydrogen equivalent 62, manufactured by Nihon Gosei Kako Co., Ltd., D90: 4.3pm (D90 measured after crushing)

4,4'-DDS: crushed 4,4'-diaminodiphenyl sulfone, active hydrogen equivalent 62, manufactured by Wakayama Seika Kogyo Co., Ltd., D90: 5.8 pm (D90 measured after crushing)

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Composition (parts by mass) | A | CELLOXIDE 3000 | 100 | 100 | 100 | 100 | 100 | 100 | 100 | 100 | 100 |
| | | EX-201 | | | | | | | | | |
| | | GAN | | | | | | | | | |
| | | 1500NP | | | | | | | | | |
| | B | 3,3'-diaminodiphenyl sulfone | 33.1 | 6.6 | 59.6 | 53.0 | 46.3 | 39.7 | 26.5 | 19.9 | 13.2 |
| | C | 4,4'-diaminodiphenyl sulfone | 33.1 | 59.6 | 6.6 | 13.2 | 19.9 | 26.5 | 39.7 | 46.3 | 53.0 |
| converted molecular weight a | | | 187 | 187 | 187 | 187 | 187 | 187 | 187 | 187 | 187 |
| b/(b + c) | | | 0.5 | 0.1 | 0.9 | 0.8 | 0.7 | 0.6 | 0.4 | 0.3 | 0.2 |
| Degree of Dissolution of Curing Agent | | Condition 1 1 hour exposure at 80° C. | ○ | ○ | ○ | | ○ | ○ | ○ | ○ | |
| | | Condition 2 2 hours exposure at 70° C. | ○ | Δ | Δ | ○ | ○ | ○ | ○ | ○ | Δ |
| | | Condition 3 1 hour exposure at 65° C. | ○ | X | X | X | ○ | | | ○ | X |

| | | | Example 10 | Example 11 | Example 12 | Example 13 | Example 14 | Example 15 | Example 16 | Example 17 | Example 18 |
|---|---|---|---|---|---|---|---|---|---|---|---|
| Composition (parts by mass) | A | CELLOXIDE 3000 | | | | | | | | | |
| | | EX-201 | 100 | | | | | | | | |
| | | GAN | | 100 | 100 | 100 | 100 | 100 | 100 | 100 | |
| | | 1500NP | | | | | | | | | 100 |
| | B | 3,3'-diaminodiphenyl sulfone | 27.9 | 25.0 | 10.0 | 40.0 | 15.0 | 35.0 | 30.0 | 20.0 | 25.0 |
| | C | 4,4'-diaminodiphenyl sulfone | 27.9 | 25.0 | 40.0 | 10.0 | 35.0 | 15.0 | 20.0 | 30.0 | 25.0 |
| converted molecular weight a | | | 234 | 250 | 250 | 250 | 250 | 250 | 250 | 250 | 270 |
| b/(b + c) | | | 0.5 | 0.5 | 0.2 | 0.8 | 0.3 | 0.7 | 0.6 | 0.4 | 0.5 |
| Degree of Dissolution of Curing Agent | | Condition 1 1 hour exposure at 80° C. | | ○ | ○ | Δ | ○ | ○ | ○ | ○ | |
| | | Condition 2 2 hours exposure at 70° C. | | ○ | X | X | | | ○ | ○ | |
| | | Condition 3 1 hour exposure at 65° C. | ○ | ○ | X | X | X | X | ○ | ○ | ○ |

TABLE 2

| | | Example 19 | Example 20 | Example 21 | Example 22 | Example 23 | Example 24 | Example 25 | Example 26 | Example 27 |
|---|---|---|---|---|---|---|---|---|---|---|
| Composition (parts by mass) | A jER630 | 100 | 100 | 100 | 100 | 100 | | | | |
| | jER807 | | | | | | 100 | 100 | 100 | |
| | jER828 | | | | | | | | | 100 |
| | jER604 | | | | | | | | | |
| | EXA-4850-1000 | | | | | | | | | |
| | B 3,3'-diaminodiphenyl sulfone | 25.8 | 38.7 | 32.3 | 45.2 | 19.4 | 18.5 | 14.8 | 22.1 | 16.4 |
| | C 4,4'-diaminodiphenyl sulfone | 33.7 | 25.8 | 32.3 | 19.4 | 45.2 | 18.5 | 22.1 | 14.8 | 16.4 |
| converted molecular weight a | | 288 | 288 | 288 | 288 | 288 | 336 | 336 | 336 | 378 |
| b/(b + c) | | 0.4 | 0.6 | 0.5 | 0.7 | 0.3 | 0.5 | 0.4 | 0.6 | 0.5 |
| Degree of Dissolution of Curing Agent | Condition 1 1 hour exposure at 80° C. | ○ | ○ | | ○ | ○ | ○ | ○ | ○ | ○ |
| | Condition 2 2 hours exposure at 70° C. | ○ | ○ | | Δ | Δ | ○ | Δ | Δ | Δ |
| | Condition 3 1 hour exposure at 65° C. | ○ | ○ | ○ | X | X | Δ | X | X | X |

| | | Example 28 | Example 29 | Example 30 | Example 31 | Example 32 | Example 33 | Example 34 | Example 35 |
|---|---|---|---|---|---|---|---|---|---|
| Composition (parts by mass) | A jER630 | | | | | | | | |
| | jER807 | | | | | | | | |
| | jER828 | 100 | 100 | | | | | | |
| | jER604 | | | 100 | 100 | 100 | | | |
| | EXA-4850-1000 | | | | | | 100 | 100 | 100 |
| | B 3,3'-diaminodiphenyl sulfone | 19.7 | 13.1 | 25.8 | 20.6 | 30.9 | 8.8 | 7.1 | 10.6 |
| | C 4,4'-diaminodiphenyl sulfone | 13.1 | 19.7 | 25.8 | 30.9 | 20.6 | 8.8 | 10.6 | 7.1 |
| converted molecular weight a | | 378 | 378 | 480 | 480 | 480 | 700 | 700 | 700 |
| b/(b + c) | | 0.5 | 0.4 | 0.5 | 0.4 | 0.5 | 0.5 | 0.4 | 0.6 |
| Degree of Dissolution of Curing Agent | Condition 1 1 hour exposure at 80° C. | ○ | Δ | ○ | ○ | ○ | Δ | Δ | Δ |
| | Condition 2 2 hours exposure at 70° C. | X | X | Δ | X | X | Δ | X | Δ |
| | Condition 3 1 hour exposure at 65° C. | | | | | | | | |

The Examples shown in Tables 1 and 2, which satisfy the requirements specified in aspect (1) or (2), allowed the curing agent in the epoxy resin composition to dissolve in the epoxy resin.

On the other hand, the Comparative Examples shown in Table 3, which do not satisfy the requirements specified in the aspects (1) or (2), did not allow the curing agent in the epoxy resin composition to dissolve in the epoxy resin. Examples 36 to 39

Similarly to Examples 1 to 35, epoxy resin compositions were prepared by measuring the components shown in Table 3 and agitating the components for 5 minutes and degassing for 1 minute and 30 seconds using the hybrid mixer HM-500 (manufactured by Keyence Corporation). A separable flask was then charged with the epoxy resin composition thus obtained, a stirrer was rotated by a three-one motor, the temperature of the resin composition was set to 70° C. while agitating the resin composition, and the resin composition was agitated for 30 minutes in an oil bath, thereby dissolving the curing agent. In order to evaluate the degree of dissolution of diaminodiphenyl sulfone, visual evaluation was made. Judgment was made according to the following criteria by visually evaluating the resin composition, in a similar manner to Examples 1 to 35. The judgment results of the degree of dissolution are shown in Table 3. A circle symbol indicates that the curing agent is completely dissolved and the epoxy resin composition becomes transparent after the exposure under the above described condition. A triangle symbol indicates that although dissolution of the curing agent was observed, dissolved residue remained, and the epoxy resin composition remains cloudy after the exposure under the above described condition. A cross symbol indicates that a large part of the curing agent is undissolved and the appearance of the epoxy resin composition is not substantially changed between before and after the exposure under the above described condition.

TABLE 3

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|
| Composition (parts by mass) | A CELLOXIDE 3000 | 100 | 100 | | | | | | | | | |
| | GAN | | | 100 | 100 | | | | | | | |
| | jER630 | | | | | 100 | 100 | | | | | |
| | jER807 | | | | | | | 100 | 100 | | | |

TABLE 3-continued

|  |  |  |  |  |  |  |  |  |  |  |  |  |
|---|---|---|---|---|---|---|---|---|---|---|---|---|
|  |  | jER828 |  |  |  |  |  |  |  |  | 100 | 100 |  |
|  |  | jER604 |  |  |  |  |  |  |  |  |  |  | 100 |
|  |  | EXA-4850-1000 |  |  |  |  |  |  |  |  |  |  |  |
|  |  | jER1001 |  |  |  |  |  |  |  |  |  |  |  |
|  | B | 3,3'-diaminodiphenyl sulfone | 0 | 58.2 | 5.0 | 45.0 | 6.5 | 58.1 | 11.1 | 25.8 | 9.8 | 23.0 | 15.5 |
|  | C | 4,4'-diaminodiphenyl sulfone | 66.2 | 5 | 45.0 | 5.0 | 58.1 | 6.5 | 25.8 | 11.1 | 23.0 | 9.8 | 36.1 |
| converted molecular weight a |  |  | 187 | 187 | 250 | 250 | 288 | 288 | 338 | 336 | 378 | 378 | 480 |
| b/(b + c) |  |  | 0 | 1 | 0.1 | 0.9 | 0.1 | 0.9 | 0.3 | 0.7 | 0.2 | 0.7 | 0.3 |
| Degree of Dissolution of Curing Agent | Condition 1 | 1 hour exposure at 80° C. | X | X | X | X | X | X | X | X | X | X | X |
|  | Condition 2 | 2 hours exposure at 70° C. | X | X | X | X |  |  | X | X | X | X | X |
|  | Condition 3 | 1 hour exposure at 65° C. |  |  | X | X | X | X |  |  |  |  |  |

|  |  |  | Comparative Example 12 | Comparative Example 13 | Comparative Example 14 | Comparative Example 15 | Comparative Example 16 | Comparative Example 17 | Comparative Example 18 | Comparative Example 19 | Comparative Example 20 | Comparative Example 21 |
|---|---|---|---|---|---|---|---|---|---|---|---|---|
| Composition (parts by mass) | A | CELLOXIDE 3000 |  |  |  |  |  |  |  |  |  |  |
|  |  | GAN |  |  |  |  |  |  |  |  |  |  |
|  |  | jER630 |  |  |  |  |  |  |  |  |  |  |
|  |  | jER807 |  |  |  |  |  |  |  |  |  |  |
|  |  | jER828 |  |  |  |  |  |  |  | 17 | 17 | 17 |
|  |  | jER604 | 100 | 100 | 100 |  |  |  |  |  |  |  |
|  |  | EXA-4850-1000 |  |  |  | 100 | 100 | 100 | 100 |  |  |  |
|  |  | jER1001 |  |  |  |  |  |  |  | 83 | 83 | 83 |
|  | B | 3,3'-diaminodiphenyl sulfone | 36.1 | 10.3 | 41.3 | 5.3 | 12.4 | 3.5 | 14.2 | 8.2 | 10.2 | 12.2 |
|  | C | 4,4'-diaminodiphenyl sulfone | 15.5 | 41.3 | 10.3 | 12.4 | 5.3 | 14.2 | 3.5 | 12.2 | 10.2 | 8.2 |
| converted molecular weight a |  |  | 480 | 480 | 480 | 700 | 700 | 700 | 700 | 853 | 853 | 853 |
| b/(b + c) |  |  | 0.7 | 0.2 | 0.5 | 0.3 | 0.7 | 0.2 | 0.8 | 0.4 | 0.5 | 0.6 |
| Degree of Dissolution of Curing Agent | Condition 1 | 1 hour exposure at 80° C. | X | X | X | X | X | X | X | Blending not possible | Blending not possible | Blending not possible |
|  | Condition 2 | 2 hours exposure at 70° C. | X |  |  | X | X |  |  | Blending not possible | Blending not possible | Blending not possible |
|  | Condition 3 | 1 hour exposure at 65° C. |  |  |  |  |  |  |  | Blending not possible | Blending not possible | Blending not possible |

Figure 2:
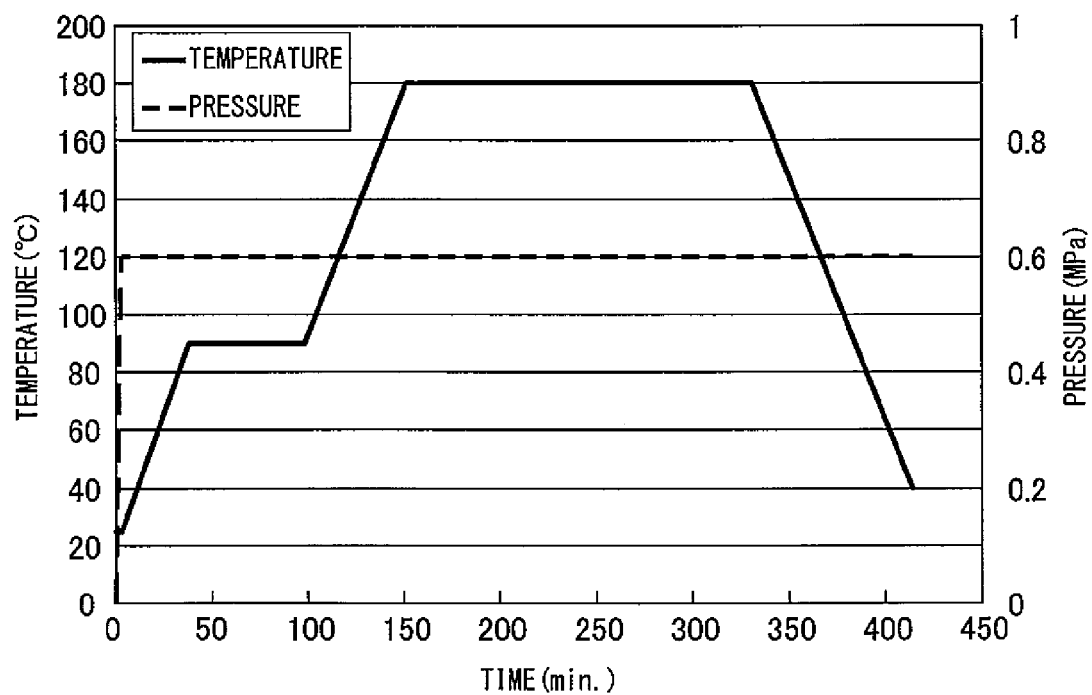
FIG. 2 is a graph showing a temperature profile and a pressure profile with respect to time during molding according to an aspect of the present invention.

Next, by performing pseudo resin infusion molding using the resin composition thus obtained, evaluation of impregnation and molding of CFRP was made. As a preform, 10 sheets of carbon fiber fabric (TR3110 manufactured by Mitsubishi Rayon Co., Ltd.) in a layered state were used, and the resin used was measured such that a resin content was 35% by mass. Molding by autoclave molding was performed with a molding bag made according to FIG. 1, in accordance with the curing profile of FIG. 2, while vacuuming at a vacuum of no greater than 5 mmHg, in such a way that: the temperature was raised to 90° C. and maintained for 1 hour, and then the temperature was further raised to 180° C. and maintained for 3 hours at a pressure of 0.6 MPa. The CFRP thus molded was superior in appearance. Plastic deformation of the CFRP thus molded was not observed even by bending by hands. A particular problem was not observed even by wiping the surface of the CFRP with a rag dampened with acetone.

TABLE 4

|  |  |  | Example 36 | Example 37 | Example 38 | Example 39 | Comparative Example 22 | Comparative Example 23 |
|---|---|---|---|---|---|---|---|---|
| Composition (parts by mass) | A | GAN |  |  | 30 |  |  |  |
|  |  | jER630 |  |  | 70 |  |  |  |
|  |  | jER807 |  | 100 |  | 100 |  | 100 |
|  |  | jER604 | 100 |  |  |  | 100 |  |
|  | B | 3,3'-diaminodiphenyl sulfone | 25.8 | 18.5 | 30.2 | 6 | 0 | 0 |
|  | C | 4,4'-diaminodiphenyl sulfone | 25.8 | 18.5 | 30.2 | 6 | 51.6 | 12 |
| converted molecular weight a |  |  | 480 | 336 | 278 | 336 | 480 | 336 |
| b/(b + c) |  |  | 0.5 | 0.5 | 0.5 | 0.5 | 0 | 0 |
| Degree of Dissolution of Curing Agent | Condition 4 | 30 min agitation at 70° C. | ○ | ○ | ○ | ○ | X | X |
|  | Impregnation and molding evaluation |  | Excellent | Excellent | Excellent | Stiffness insufficient, Sticky | Sticky | Stiffness insufficient, Sticky |

Comparative Examples 22 and 23

Preparation of resin compositions, dissolution of the curing agent, evaluation of impregnation and molding were performed in a similar manner to Examples 36 to 39. As an exception, the resin compositions were in accordance with Table 4. In addition, in the evaluation of the degree of dissolution of the curing agent, it was determined that the curing agent was not dissolved. Using the epoxy resin composition thus obtained, in which the curing agent was dissolved, molding of CFRP was performed.

In Comparative Example 22, the molded CFRP was superior in appearance. Plastic deformation of the CFRP thus molded was not observed even by bending by hands. In a wiping test, in which the surface of the CFRP was rubbed with a rag dampened with acetone, a phenomenon was observed in which the resin of the surface leaked out and the surface became sticky. Dissolving of the surface resin by way of the acetone is considered to have caused a curing failure.

In Comparative Example 23, the molded CFRP, which did not have sufficient stiffness, was plastically deformed when bended by hand and did not return to the original shape. In the wiping test, in which the surface of the CFRP was rubbed with a rag dampened with acetone, the CFRP was plastically deformed, a phenomenon was observed in which the resin of the surface leaked out, and the surface became sticky. Dissolving of the surface resin by way of the acetone is considered to have caused a curing failure.

As described above in detail, by using both 3,3'-diaminodiphenyl sulfone [B] and 4,4'-diaminodiphenyl sulfone [C] as the curing agent, the epoxy resin composition of the present invention can make the curing agent dissolve in the epoxy resin at a temperature lower than a case of using diaminodiphenyl sulfone of a singular structure. Therefore, the FRP obtained from the epoxy resin composition can reduce filtration of the curing agent and can suppress deterioration of physical properties due to curing failure. Therefore, the present invention is industrially useful.

EXPLANATION OF REFERENCE NUMERALS

1 Stainless steel mold
2 Resin composition
3 Rubber dam
4 Preform
5 SUS plate
6 Sealing tape
7 Heat resistant tape
8 Holes made by pushpin at 2 cm intervals
9 Nonwoven fabric
10 Bagging film
11 Vacuuming outlet connected to vacuum pump

The invention claimed is:

1. A production method for obtaining a fiber-reinforced composite material by impregnating a fiber assembly with an epoxy resin composition and curing, the method comprising
preparing the epoxy resin composition including a constitutional element [A], a constitutional element [B], and a constitutional element [C] by blending at a temperature of at least 60° C. and no higher than 80° C., wherein,
given that a blending amount of the constitutional element [B] is b parts by mass and a blending amount of the constitutional element [C] is c parts by mass with respect to 100 parts by mass of the constitutional element [A], wherein the epoxy resin composition satisfies equation (2) when the constitutional element [A] has a molecular weight in a range of equation (1), the epoxy resin composition satisfies equation (4) when the constitutional element [A] has a molecular weight in a range of equation (3), and the epoxy resin composition satisfies equation (6) when the constitutional element [A] has a molecular weight in a range of equation (5), wherein
the constitutional element [A] is an epoxy resin of a converted molecular weight a;
the constitutional element [B] is 3,3'-diaminodiphenyl sulfone; and
the constitutional element [C] is 4,4'-diaminodiphenyl sulfone, $$150 < a \leq 200 \tag{1}$$

$$0 < b/(b+c) < 1 \tag{2}$$

$$200 < a \leq 350 \tag{3}$$

$$0.002a - 0.35 \leq b/(b+c) \leq -0.002a + 1.35 \tag{4}$$

$$350 < a \tag{5}$$

$$0.35 \leq b/(b+c) \leq 0.65 \tag{6},$$

the converted molecular weight a being defined as follows:
in a case of using only one kind of epoxy resin as the epoxy resin [A], the converted molecular weight a is a product of an epoxy equivalent of the epoxy resin used and the number of epoxy groups in a molecule of the epoxy resin;
and in a case of using a plurality of kinds of epoxy resin as the epoxy resin [A], the converted molecular weight a is a value obtained by: obtaining a product of an epoxy equivalent and the number of epoxy groups in a molecule of the epoxy resin for each epoxy resin component; and then weighted-averaging, per blending ratios of components composing the epoxy resin [A], the product of the epoxy equivalent and the number of epoxy groups thus obtained for each epoxy resin component.

2. The production method according to claim 1, wherein the epoxy resin composition further satisfies equation (7):

$$15 \leq (b+c) \leq 70 \tag{7}.$$

3. The production method according to claim 1, wherein the temperature is at least 65° C. and no higher than 80° C.

4. An epoxy resin composition comprising a constitutional element [A], a constitutional element [B], and a constitutional element [C], wherein,
given that a blending amount of the constitutional element [B] is b parts by mass and a blending amount of the constitutional element [C] is c parts by mass with respect to 100 parts by mass of the constitutional element [A] included in the epoxy resin composition,
wherein the epoxy resin composition satisfies equation (9) when the constitutional element [A] has a molecular weight in a range of equation (8), the epoxy resin composition satisfies equation (11) when the constitutional element [A] has a molecular weight in a range of equation (10), and the epoxy resin composition satisfies equation (13) when the constitutional element [A] has a molecular weight in a range of equation (12),
wherein
the constitutional element [A] is an epoxy resin of a converted molecular weight a;
the constitutional element [B] is 3,3'-diaminodiphenyl sulfone; and
the constitutional element [C] is 4,4'-diaminodiphenyl sulfone, $$150 < a \leq 200 \quad (8)$$

$$0 < b/(b+c) < 1 \quad (9)$$

$$200 < a \leq 350 \quad (10)$$

$$0.002a - 0.35 \leq b/(b+c) \leq -0.002a + 1.35 \quad (11)$$

$$350 < a \quad (12)$$

$$0.35 \leq b/(b+c) \leq 0.65 \quad (13)$$

the converted molecular weight a being defined as follows:
in a case of using only one kind of epoxy resin as the epoxy resin [A], the converted molecular weight a is a product of an epoxy equivalent of the epoxy resin used and the number of epoxy groups in a molecule of the epoxy resin;

and in a case of using a plurality of kinds of epoxy resin as the epoxy resin [A], the converted molecular weight a is a value obtained by: obtaining a product of an epoxy equivalent and the number of epoxy groups in a molecule of the epoxy resin for each epoxy resin component; and then weighted-averaging, per blending ratios of components composing the epoxy resin [A], the product of the epoxy equivalent and the number of epoxy groups thus obtained for each epoxy resin component, and wherein the epoxy resin composition is obtained by being blended at a temperature of at least 60° C. and no higher than 80° C.

5. The epoxy resin composition according to claim 4, wherein the epoxy resin composition satisfies equation (15) when the constitutional element [A] has a molecular weight in a range of equation (14), the epoxy resin composition satisfies equation (17) when the constitutional element [A] has a molecular weight in a range of equation (16), and the epoxy resin composition satisfies equation (19) when the constitutional element [A] has a molecular weight in a range of equation (18):

$$150 < a \leq 190 \quad (14)$$

$$0.1 \leq b/(b+c) \leq 0.9 \quad (15)$$

$$190 < a \leq 365 \quad (16)$$

$$0.002a - 0.28 \leq b/(b+c) \leq -0.0017a + 1.23 \quad (17)$$

$$365 < a \quad (18)$$

$$0.45 \leq b/(b+c) \leq 0.60 \quad (19)$$

6. The epoxy resin composition according to claim 4, wherein the epoxy resin composition further satisfies equation (20):

$$150 < a < 800 \quad (20)$$

7. The epoxy resin composition according to claim 4, wherein the epoxy resin composition further satisfies equations (21) and (22):

$$150 \leq a \leq 357 \quad (21)$$

$$0.00169a - 0.103 \leq b/(b+c) \leq -0.0019a + 1.19 \quad (22)$$

8. The epoxy resin composition according to claim 4, wherein the epoxy resin composition further satisfies equations (23) and (24):

$$150 \leq a \leq 300 \quad (23)$$

$$0.00169a - 0.103 \leq b/(b+c) \leq -0.0010a + 0.90 \quad (24)$$

9. The epoxy resin composition according to claim 4, wherein the epoxy resin composition further satisfies equation (25):

$$15 \leq (b+c) \leq 70 \quad (25)$$

10. The epoxy resin composition according to claim 4, wherein the temperature is at least 65° C. and no higher than 80° C.

11. The epoxy resin composition according to claim 5, wherein the epoxy resin composition further satisfies equation (20):

$$150 < a < 800 \quad (20)$$

12. The epoxy resin composition according to claim 5, wherein the epoxy resin composition further satisfies equations (21) and (22):

$$150 \leq a \leq 357 \quad (21)$$

$$0.00169a - 0.103 \leq b/(b+c) \leq -0.0019a + 1.19 \quad (22)$$

13. The epoxy resin composition according to claim 5, wherein the epoxy resin composition further satisfies equations (23) and (24):

$$150 \leq a \leq 300 \quad (23)$$

$$0.00169a - 0.103 \leq b/(b+c) \leq -0.0010a + 0.90 \quad (24)$$

14. The epoxy resin composition according to claim 5, wherein the epoxy resin composition further satisfies equation (25):

$$15 \leq (b+c) \leq 70 \quad (25)$$

* * * * *